United States Patent
Wrixon et al.

(10) Patent No.: US 10,437,956 B2
(45) Date of Patent: Oct. 8, 2019

(54) PESSIMISM REDUCTION IN STATIC TIMING ANALYSIS

(71) Applicant: Synopsys, Inc., Mountain View, CA (US)

(72) Inventors: Adrian Wrixon, Dublin (IE); Anton Belov, Dublin (IE); Maurice Keller, Dublin (IE); Paul Frain, Dublin (IE)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 14/997,293

(22) Filed: Jan. 15, 2016

(65) Prior Publication Data

US 2017/0206301 A1    Jul. 20, 2017

(51) Int. Cl.
  *G06F 17/50*  (2006.01)

(52) U.S. Cl.
  CPC ...... *G06F 17/5081* (2013.01); *G06F 17/5031* (2013.01)

(58) Field of Classification Search
  CPC ............ G06F 17/5031; G06F 2217/84; G06F 17/5045; G06F 2217/62; G06F 17/505; G06F 17/5068; G06F 17/5022; G06F 2217/82; G06F 17/5059; G06F 1/10; G06F 2217/06; G06F 2217/78; G06F 17/5009
  USPC .......................................... 716/108, 113, 134
  See application file for complete search history.

(56) References Cited

U.S. PATENT DOCUMENTS

| | | | |
|---|---|---|---|
| 7,237,212 B2 | 6/2007 | Kucukcakar et al. | |
| 8,713,501 B1* | 4/2014 | Le | G06F 17/5045 716/113 |
| 8,745,561 B1* | 6/2014 | Garg | G06F 17/5031 703/16 |
| 8,762,908 B1 | 6/2014 | Chang et al. | |
| 8,938,703 B1* | 1/2015 | Saurabh | G06F 17/5031 716/113 |
| 2006/0090150 A1* | 4/2006 | Kucukcakar | G06F 17/5031 716/113 |
| 2011/0131540 A1* | 6/2011 | Wu | G06F 17/5031 716/108 |

(Continued)

OTHER PUBLICATIONS

Hitchcock, R.B., "Timing Verification and the Timing Analysis Program," 19th Design Automation Conference, Paper 34.2, IEEE, 1982, pp. 594-604.

(Continued)

*Primary Examiner* — Nghia M Doan
(74) *Attorney, Agent, or Firm* — Fenwick & West LLP

(57) ABSTRACT

A method for performing graph-based static timing analysis comprises reading in a design of an integrated circuit having a subset of timing paths, each timing path of the subset having a common point, wherein the common point is identical for all timing paths of the subset. The method comprises initiating a timing signal at the common point, the timing signal propagating along a plurality of timing arcs of the subset. The timing signal has a plurality of attributes varying with the propagation including a depth value and/or a distance value. The method comprises determining a derating factor for a delay of at least one of the plurality of timing arcs depending on the depth and/or the distance value of the timing signal at a pin of said at least one timing arc, and generating a timing report based on the derating factor.

21 Claims, 3 Drawing Sheets

(56) References Cited

U.S. PATENT DOCUMENTS

2013/0227510 A1\* 8/2013 Katz ................... G06F 17/5031
                                                        716/113
2013/0239079 A1\* 9/2013 Tetelbaum .......... G06F 17/5031
                                                        716/113

OTHER PUBLICATIONS

Synopsys White Paper: "PrimeTime® Advanced OCV Technology," Synopsys, Inc., Apr. 2009, 9 pages.

\* cited by examiner

PESSIMISM REDUCTION IN STATIC TIMING ANALYSIS

BACKGROUND OF THE INVENTION

The invention relates to static timing analysis, STA, in particular to graph-based static timing analysis, GBA.

Current integrated circuit, IC, designs, may include an extremely large number, for example in the order of $10^7$-$10^8$ or even more, of cells such as logic gates and synchronous or sequential devices connected by interconnects. The synchronous or sequential devices include flip-flops and latches. Herein, a register denotes a synchronous or sequential device comprising at least one flip-flop or latch.

In such synchronous designs, violations of timing constraints may occur. Such violations may include setup time violations and hold time violations. A setup time violation occurs when a signal arrives too late at a register, while a hold time violation occurs when an input signal changes too soon after an active transition of a corresponding clock signal. The arrival time of a signal is subject to variations of several sources including variations in temperature, voltage, manufacturing processes and so forth.

By means of STA, for example in the course of electronic design automation, EDA, it is achieved to verify that the timing constraints are met despite said variations to ensure proper operation of the IC.

In contrast to path-based STA, where individual timing paths are analyzed in isolation, in GBA a multitude of timing paths is analyzed simultaneously. A delay value is associated to each cell and each interconnect of the design to evaluate a delay of the timing paths of the design. To account for variations such as on-chip variations due to manufacturing variability, a global derating factor may be applied for the delay values of all cells and interconnects across the whole chip. However, such global derating factor results in a too pessimistic estimation for the derated delay in particular with the increasing influence of on-chip variations.

Advanced on-chip variation, AOCV, analysis is an STA methodology whereby the derating factor of a cell or an interconnect in a timing path is taken to be a function of the path depth, that is the number of logic stages in the path, and a physical distance covered by the path. Both depth and distance are measured from the common point of a timing path, defined as the output pin of the last cell in the portion of the clock path common to launch and capture segments of the timing path.

However, due to its path-base nature, presently known AOCV analysis introduces a large amount of pessimism, that is underestimated path slack values, into GBA due to exaggerated derating factors. This pessimism originates for example from the following two sources:
i) signals launched at a register are associated with the common point resulting in the most conservative, that is worst-case, among the common points of all timing paths launched by that register, and
ii) the AOCV metrics, that is logic depth and distance, applied at a given timing arc are dictated by the worst-case metrics for all timing paths which traverse that timing arc. In the following, pessimism associated with i) is denoted common point pessimism, while the pessimism associated with ii) is denoted merging pessimism.

Any amount of extra pessimism in STA is harmful as it has a direct effect on both the development and verification effort and the performance and power profiles of the final product.

SUMMARY OF THE INVENTION

The present disclosure provides an improved concept reducing the amount of pessimism in GBA, in particular reducing the amount of pessimism introduced by AOCV analysis in GBA.

According to the improved concept, an IC design has a set of timing paths with a subset of timing paths, wherein the common point is identical for each timing path of the subset. Said common point of the subset is used as a differentiating property of timing signals initiated at the common point. For example, timing signals originating at the common point of the subset are not merged with timing signals originating at a further common point being different from the common point of the subset. AOCV depth and distance are treated as attributes, in particular as a propagated component or property, of a timing signal, rather than a fixed value of a pin of the design. In this way, a set of AOCV metrics from which worst-case metrics are selected may be reduced and consequently pessimism may be reduced.

According to the improved concept, a method for performing graph-based static timing analysis, GBA, of an integrated circuit, IC, is provided. The method comprises reading in a design of the IC, the design having a set of timing paths. The set of timing paths has a subset of timing paths, wherein each timing path of the subset of timing paths has a launch path, a capture path and a common point of the launch path and the capture path. The common point is identical for all timing paths of the subset of timing paths and can therefore be denoted as common point of the subset. The subset of timing paths comprises a plurality of pins, namely a plurality of pins of cells and interconnects of the subset of timing paths, and a plurality of timing arcs. Therein, each timing arc of the subset comprises two neighboring pins of the subset. The common point corresponds for example to a common point pin of said plurality of pins.

The method further comprises initiating a timing signal at the common point of the subset. The timing signal propagates along a plurality of timing arcs of the subset of timing paths. The timing signal has a plurality of attributes varying with the propagation of the timing signal along the plurality of timing arcs. In particular, the plurality of attributes vary for different pins of the plurality of pins of the subset. The plurality of attributes include a depth value and/or a distance value, in particular an AOCV depth value and/or an AOCV distance value. The plurality of attributes may for example include further STA attributes such as an arrival time and/or a slew value.

The method further comprises determining, in particular computing, a derating factor for a delay of at least one of the plurality of timing arcs, the derating factor depending on the depth value of the timing signal at a pin of said at least one timing arc and/or depending on the distance value of the timing signal at said pin of said at least one timing arc.

The method further comprises generating a timing report based on the derating factor. The timing report may for example comprise information about whether or not timing constraints are met for one or more of the timing paths of the subset of timing paths. The timing report may for example be outputted to a user and/or stored for example to a non-transitory computer-readable storage medium. The timing report may for example be used to modify, adapt and/or release or partially release the design, a netlist of the design and/or a physical implementation scheme of the design.

The timing signal is for example a virtual signal characterized by the plurality of attributes. The propagation of the timing signal along the plurality of timing arcs corresponds for example to a computation of values of the plurality of attributes at the pins of the plurality of timing arcs.

According to some implementations of the method, the subset of timing paths comprises at least two timing paths, for example a plurality of timing paths.

For each timing path of the subset, the respective capture path extends from a respective clock source to a clock input of one or more capture devices of said timing path. Each of said one or more capture devices includes at least one flip-flop or latch. The respective launch path of said timing path of the subset extends from the said clock source to a data input of said one or more capture devices. The respective launch path comprises a clock segment extending from said clock source to a clock input of a respective launch device, which includes at least one flip-flop or latch, and a data segment extending from an output of said launch device to a data input of said capture device.

The common point of said timing path corresponds to a pin of the subset of timing paths being common to the capture path and the launch path of said timing path. In particular, the common point of said timing path corresponds to an output pin of the last cell of the clock network common to said capture path and said launch path of said timing path. The common point is identical for all timing paths of the subset.

According to some implementations of the method, the subset of timing paths comprises all timing paths of the set of timing paths having said common point.

When propagating along the subset of timing paths and along the plurality of timing arcs, respectively, the timing signal may for example split into sub-signals. The sub-signals may for example comprise respective capture signals propagating along the capture paths of the subset of timing paths and respective launch signals propagating along the launch paths of the subset of time paths. Two or more of the sub-signals may for example merge again to form a respective merged signal. However, only sub-signals originating from said timing signal, that is from the same timing signal, and consequently from the common point of the subset of timing paths are merged. Upon merging, one or more of the plurality of attributes of the timing signal may be merged according to a worst-case selection in view of the resulting derating factor.

According to some implementations of the method, the depth value of the timing signal at said pin of said at least one timing arc is given by a number of cells of the design lying between the common point and said pin of said at least one timing arc. In particular, the depth value of the timing signal at said pin of said at least one timing arc is given by a number of cells of the design lying on the subset of timing paths, in particular lying on a respective timing path of the subset of timing paths comprising said at least one timing arc, between the common point and said pin of said at least one timing arc.

That is, the depth value of the timing signal at said pin of said at least one timing arc corresponds to a number of logic stages between the common point and said pin.

If said at least one timing arc is part of more than one timing paths of the subset of timing paths, the depth value of the timing signal at said pin of said at least one timing arc is given by the worst-case depth value calculated in the way described above. Therein worst-case refers to the determination of the derating factor based on the depth value. In particular, the worst-case depth value corresponds to the largest derating factor or to the smallest derating factor.

In particular, the depth value of the timing signal at any given pin of the plurality of pins of the subset of timing paths is given by a number of cells of the design lying between the common point and said given pin.

The depth value of the timing signal at any given pin of the plurality of pins of the subset of timing paths is given by an AOCV depth calculated for said given pin with respect to the common point of the subset of timing paths.

According to some implementations, the distance value of the timing signal is given by a distance, in particular a physical distance, between the common point of the subset of timing paths and said pin of said at least one timing arc.

In particular, the distance value of the timing signal at said pin of said at least one timing arc corresponds to a Euclidian distance between physical coordinates of the common point and physical coordinates of said pin. Said coordinate correspond to coordinates on a finished IC chip.

If said at least one timing arc is part of more than one timing paths of the subset of timing paths, the distance value of the timing signal at said pin of said at least one timing arc is given by the worst-case distance value calculated in the way described above. Therein worst-case refers to the determination of the derating factor based on the distance value. In particular, the worst-case distance value corresponds to the largest derating factor or to the smallest derating factor.

In particular, the distance value of the timing signal at any given pin of the plurality of pins of the subset of timing paths is given by a distance, in particular a physical distance, between the common point of the subset of timing paths and said given.

The distance value of the timing signal at any given pin of the plurality of pins of the subset of timing paths is given by an AOCV distance calculated for said given pin with respect to the common point of the subset of timing paths.

In particular, the distance value of the timing signal at said given pin is given by a length of a diagonal of a bounding box, in particular in an AOCV bonding box, enclosing the common point and said given pin.

According to some implementations of the method, the depth value and the distance value correspond to a depth value and a distance value of cells, respectively.

According to some implementations of the method, the depth value and the distance value correspond to a depth value and a distance value of interconnects, respectively.

The improved concept and all implementations of the described method may be applied to cells and/or to interconnects in equal measure.

According to some implementations of the method, the depth value and the distance value of the timing signal, in particular at said pin of said at least one timing arc, depends on the common point of the subset of timing paths and does not depend on a further common point of a further timing path of the design, the further timing path being not comprised by the subset of timing paths. In particular, the depth value and the distance value of the timing signal do not depend on a further timing signal, in particular a further depth value or a further distance value of the further timing signal, the further timing signal being initiated at the further common point.

Calculating the depth and/or distance value of the timing signal may involve known worst-case techniques of GBA. However, according to the improved concept, only timing paths of the subset of timing paths, that is only timing paths originating from the same common point, are taking into account for the respective worst-case techniques. In particular, there is neither merging of timing signals originating from different common points nor depth or distance resetting with respect to a further common point.

Consequently, the common point pessimism i) explained above may be reduced or fully avoided according to the improved concept.

According to some implementations of the method, the design comprises a first group of registers and a second group of registers, wherein each register of the first group is involved in one of the subset of timing paths as a launch device and each register of the second group is involved in one of the subset of timing paths as a capture device.

According to some implementations of the method, the first group comprises at least two registers, for example tens or hundreds of registers, and/or the second group comprises at least two registers, for example tens or hundreds of registers.

According to some implementations, all registers of the first group and all registers of the second group are associated to the same common point, namely the common point of the subset of timing paths.

By grouping at least two, in particular by grouping a large number, of registers in the first and the second group, respectively, the registers comprised by the first group may be treated as a first register unit for performing the GBA and the registers comprised by the second group may be treated as a second register unit for performing the GBA.

The first group and the second group of registers may for example be formed by selecting a first and a second representative pin, respectively, in a clock network.

By means of the grouping into the first and the second groups of registers, resource requirements, in particular runtime and memory requirements, of the GBA may be controlled or reduced.

According to some implementations, the method further comprises calculating at least one delay value of the subset of timing paths depending on a derating the delay of said at least one timing arc. The derated delay of said at least one timing arc depends on a nominal delay of said at least one timing arc and on the determined derating factor. The timing report is generated based on the calculated delay.

According to some implementations of the method, the determining of the derating factor comprises determining a backward depth of said at least one timing arc and summing up the depth value of the timing signal at said pin of said at least one timing arc and said backward depth. The derating factor depends on the sum of the depth value of the timing signal at said pin of said at least one timing arc and said backward depth. In some implementations, conventional AOCV GBA techniques may be used to calculate said backward depth.

According to some implementations of the method, said backward depth of said at least one timing arc is given by a number of cells of the design lying between an end point of the subset of timing paths and said pin of said at least one timing arc. In particular, the backward depth of said at least one timing arc is given by a number of cells of the design lying on the subset of timing paths, in particular lying on a respective timing path of the subset of timing paths comprising said at least one timing arc, between the end point of the subset of timing paths and said pin of said at least one timing arc.

According to some implementations of the method, the determining of the derating factor comprises determining a backward distance of said at least one timing arc and summing up the distance value of the timing signal at said pin of said at least one timing arc and the backward distance. The derating factor depends on the sum of the distance value of the timing signal at said pin of said at least one timing arc and said backward distance. In some implementations, conventional AOCV GBA techniques may be used to calculate said backward distance.

According to some implementations of the method, the backward distance of said at least one timing arc is given by a distance, in particular a physical distance, between an end point of the subset of timing paths and said pin of said at least one timing arc. In particular, the backward distance of said at least one timing arc may be given by a length of a diagonal of a bounding box, in particular a backward bounding box, in particular an AOCV bounding box, enclosing said pin of said at least one timing arc and said end point.

According to some implementations of the method, the design comprises a further timing path, the further timing path being not comprised, in particular not fully comprised, by the subset of timing paths. The further timing path includes said at least one timing arc for which the derating factor is determined. The timing signal initiated at the common point of the subset of timing paths is not merged with a further timing signal initiated at the further common point during the GBA. In particular, the timing signal initiated at the common point of the subset of timing paths is not merged with said further timing signal initiated at the further common point when determining the derating factor for the delay of said at least one timing arc.

Consequently, the merging pessimism ii) explained above may be reduced according to the improved concept.

According to some implementations of the method, the subset of time paths comprises at least one branching pin with at least one external path segment connected to the branching pin. Said at least one external path segment is not included in the subset of timing paths. The method further comprises associating a marker to the branching pin, wherein the marker indicates that said external path segment is not comprised by the subset of timing paths.

According to some implementations, the method further comprises preventing the timing signal from propagating along said external path segment based on the marker.

By means of said preventing, which may be denoted as signal pruning, the timing signal initiated at the common point is prevented from propagating in directions that are not relevant to said common point. By means of the signal pruning resource requirements, in particular runtime and memory requirements, may be controlled or reduced.

According to some implementations, the method is performed by means of a circuit design tool. The method may for example be performed by an electronic design automation, EDA, tool.

According to the improved concept, also a computer-program product is provided. The computer-product comprises a computer-readable storage medium, in particular a tangible and non-transitory computer-readable storage medium, and a computer program module. The computer program module is stored in the computer-readable storage medium and contains instructions for GBA of an IC. The computer program module is configured to be executed by a processor. When the computer program module is being executed by said processor, the instructions cause the processor to execute a process comprising steps, in particular all steps, of a method for performing GBA of an IC according to the improved concept described herein.

According to some implementations of the computer-program product, when the computer program module is being executed by said processor, the instructions cause the processor to execute a process comprising reading in a design of the IC, the design having a set of timing paths, wherein each timing path of a subset of the set of timing paths has a launch path, a capture path and a common point of the launch path and the capture path. The common point is identical for all timing paths of the subset of timing paths.

The process further comprises initiating a timing signal at the common point, the timing signal propagating along a plurality of timing arcs of the subset of timing paths. The timing signal has a plurality of attributes varying with the propagation along the plurality of timing arcs and the plurality of attributes includes a depth value and/or a distance value. The process further comprises determining a derating factor for a delay of at least one of the plurality of timing arcs, and the derating factor depending on the depth value of the timing signal at a pin of said at least one timing arc and/or depending on the distance value of the timing signal at said pin of said at least one timing arc. The process further comprises generating a timing report based on the derating factor.

According to some implementations of the computer-program product, the computer program module is comprised by an EDA software and/or an EDA tool.

Further implementations of the computer-program product are readily derived by any person skilled in the art from the various implementations of the method and vice versa.

According to the improved concept, also a computer system is provided. The computer system comprises a processor, a memory and a computer program module, the computer program module being stored in the memory and containing instructions for GBA of an IC. The processor is configured to execute the computer program module, wherein when the computer program module is being executed by the processor, the instructions cause the processor to execute a process comprising steps, in particular all steps, of a method for performing GBA of an IC according to the improved concept described herein.

According to some implementations of the computer system, when the computer program module is being executed by said processor, the instructions cause the processor to execute a process comprising reading in a design of the IC, the design having a set of timing paths, wherein each timing path of a subset of the set of timing paths has a launch path, a capture path and a common point of the launch path and the capture path. The common point is identical for all timing paths of the subset of timing paths.

The process further comprises initiating a timing signal at the common point, the timing signal propagating along a plurality of timing arcs of the subset of timing paths. The timing signal has a plurality of attributes varying with the propagation along the plurality of timing arcs and the plurality of attributes includes a depth value and/or a distance value. The process further comprises determining a derating factor for a delay of at least one of the plurality of timing arcs, and the derating factor depending on the depth value of the timing signal at a pin of said at least one timing arc and/or depending on the distance value of the timing signal at said pin of said at least one timing arc. The process further comprises generating a timing report based on the derating factor.

Further implementations of the computer system are readily derived by any person skilled in the art from the various implementations and embodiments of the method and/or the computer-program product and vice versa.

BRIEF DESCRIPTION OF THE DRAWINGS

In the following, the improved concept is explained in detail with the aid of exemplary implementations by reference to the drawings. Components that are functionally identical or have an identical effect may be denoted by identical references. Identical components and/or components with identical effects may be described only with respect to the figure where they occur first and their description is not necessarily repeated in subsequent figures.

DETAILED DESCRIPTION

Figure 1:
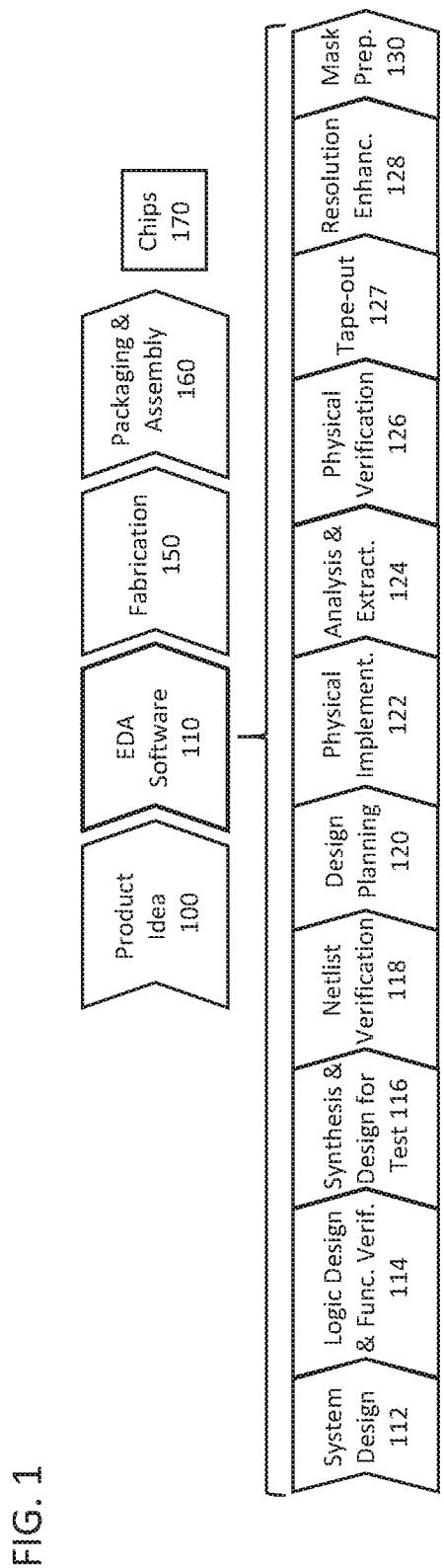
FIG. 1 shows a simplified representation of an illustrative integrated circuit design flow.

FIG. 1 shows a simplified representation of an illustrative design flow for designing an electronic circuit in particular an integrated circuit, IC. An implementation of a method according to the improved concept may for example be embedded within such design flow. However, an implementation of a method according to the improved concept may also be utilized within another design flow or independently from a design flow.

At a high level, the process starts with the product idea (step 100) and is realized in an Electronic Design Automation, EDA, software design process (step 110). When the design is finalized, it can be taped-out (step 127). At some point after tape-out, the fabrication process (step 150) and packaging and assembly processes (step 160) occur, resulting ultimately in finished IC chips (result 170).

The EDA software design process (step 110) itself is composed of a number of steps 112-130, shown in linear fashion for simplicity. In an actual integrated circuit design process, the particular design might have to go back through steps until certain tests are passed. Similarly, in any actual design process, these steps may occur in different orders and combinations. This description is therefore provided by way of context and general explanation rather than as a specific, or recommended, design flow for a particular integrated circuit.

A brief description of the component steps of the EDA software design process (step 110) is provided.

System design (step 112): Designers describe functionalities they want to implement. They may perform what-if planning to refine functionality, check costs, etc. Hardware-software architecture partitioning may be carried out at this stage.

Logic design and functional verification (step 114): At this stage, a VHDL, SystemVerilog or Verilog code for modules in the system is written and the design is checked for functional accuracy. More specifically, the design is checked to ensure that it produces correct outputs in response to particular input stimuli.

Synthesis and design for test (step 116): Here, the VHDL/Verilog is translated to a netlist. The netlist can be optimized for the target technology. Additionally, the design and implementation of tests to permit checking of the finished chip occurs.

Netlist verification (step 118): At this step, the netlist is checked for compliance with timing constraints and for correspondence with the VHDL/Verilog source code. Aspects of the invention, for example a method according to the improved concept, may be performed during this step 118.

Design planning (step 120): Here, an overall floorplan for the chip is constructed and analyzed for timing and top-level routing. Aspects of the invention, for example a method according to the improved concept, may be performed during this step 120.

Physical implementation (step 122): The placement (positioning of circuit elements) and routing (connection of the same) is carried out in this step (place-and-route process).

Analysis and extraction (step 124): In this step, the circuit function is verified at a transistor level, in turn permitting what-if refinement. Aspects of the invention, for example a method according to the improved concept, may be performed during this step 124.

Physical verification (step 126): At this step various checking functions are performed to ensure correctness for: manufacturing, electrical issues, lithographic issues, and circuitry.

Tape-out (step 127): This step provides the "tape-out" data to be used (after lithographic enhancements are applied if appropriate) for production of masks for lithographic use to produce finished chips.

Resolution enhancement (step 128): This step involves geometric manipulations of the layout to improve manufacturability of the design. This step for example includes optical proximity correction, OPC.

Mask data preparation (step 130): This step provides mask-making-ready "tape-out" data for production of masks for lithographic use to produce finished chips. Often this step includes partitioning or fracturing non-rectangular shaped islands into rectangles.

As mentioned, aspects of the invention may be performed during netlist verification (step 118), design planning (step 120) and/or during analysis and extraction (step 124). However, it may also be suitable to perform aspects of the invention during other steps of the EDA process or during steps of another circuit design process.

Figure 2A:
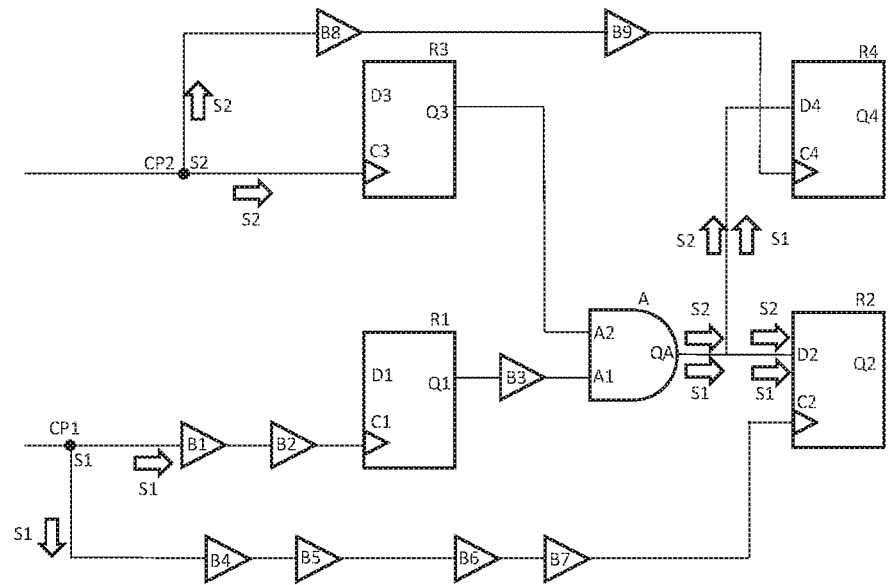
FIGS. 2A and 2B show an exemplary part of an integrated circuit design and aspects of an exemplary implementation of a method according to the improved concept.

FIG. 2A shows an exemplary part of an integrated circuit design and aspects of an exemplary implementation of a method according to the improved concept. The design shown in FIG. 2A is chosen as an example only and is not to be understood as limiting an applicability of the method according to the improved concept.

The design comprises a first register R1, for example a flip-flop, with a clock input pin C1, a data input pin D1 and an output pin Q1. The design comprises a second register R2, for example a flip-flop, with a clock input pin C2, a data input pin D2 and an output pin Q2. The design may further comprise a logic gate A, for example an AND-gate, with a first input pin A1, a second input pin A2 and an output pin QA. The output pin QA of the gate A is connected to the input pin D2 of the second register R2.

The design may further comprise a first buffer element B1 and a second buffer element B2 connected in series. An output pin of the second buffer element B2 is for example connected to the clock input pin C1 of the first register R1. The design may further comprise a third buffer element B3 with an output pin connected to the first input pin A1 of the gate A and with an input pin connected to the output pin Q1 of the first register R1. The design may further comprise a fourth, a fifth, a sixth and a seventh buffer element B4, B5, B6, B7 connected in series. An output pin of the seventh buffer element B7 is for example connected to the clock input pin C2 of the second register R2.

An input pin of the first buffer element B1 and an input pin of the fourth buffer element B4 may be connected to a first common point pin CP1 of the design.

Consequently, the first register R1 acts as a launch device for a first timing path of the design and the second register R2 acts as a capture device of the first timing path. The first timing path has a capture path comprising for example the fourth, fifth, sixth and seventh buffer elements B4, B5, B6, B7 and a launch path comprising for example the first, second and third buffer element B1, B2, B3, the first register R1 and the gate A. The second register may for example also be assigned to the capture path. The capture path and the launch path of the first timing path share the first common point pin CP1. Thus, according to STA, the first common point pin CP1 may be denoted as the common point of the first timing path.

It is pointed out that the specific circuit components comprised by the first timing path are chosen as non-limiting examples only. The method may be analogously applied for any timing path of a synchronous design comprising a respective capture device and a respective launch device.

The design may further comprise a third register R3, for example a flip-flop, with a clock input pin C3, a data input pin D3 and an output pin Q3 as well as a fourth register R4, for example a flip-flop, with a clock input pin C4, a data input pin D4 and an output pin Q4. The design may comprise an eighth buffer element B8 and a ninth buffer element B9 connected in series. An output pin of the ninth buffer element B9 is for example connected to the clock input pin C4 of the fourth register R4.

An input pin of the eighth buffer element B8 and the clock input pin C3 of the third register R3 are for example connected to a second common point pin CP2 of the design. Consequently, the third register R3 acts as a launch device for a second timing path of the design and the fourth register R2 acts as a capture device of the second timing path. The second timing path has a capture path comprising for example the eighth and ninth buffer element B8, B9 and the fourth register R4 and a launch path comprising for example the third register R3 and the gate A. The capture path and the launch path of the first timing path share the second common point pin CP2. Thus, according to STA, the second common point pin CP2 may be denoted as the common point of the second timing path.

The second timing path is shown only to highlight the advantages of the improved concept. However, it is not necessary to consider the second timing path for carrying out a method according to the improved concept. In particular, the specific circuit components comprised by the second timing path are chosen as non-limiting examples only.

In the following example, the improved concept is explained with respect to depth and distance values corresponding to depth and distance values of cells. The skilled person may be readily adapt the example to depth and distance values of interconnects based on the following explanations.

A first timing signal S1 may be initiated at the first common point CP1. The first timing signal S1 has a plurality of attributes varying along the first timing path including for example an arrival time and a slew. According to the improved concept, the plurality of attributes of the first timing signal S1 further comprises a depth value and a distance value varying along the first timing path. For any pin of the first timing path, the depth value of the first timing signal S1 at said pin corresponds for example to a number of logic stages between the first common point CP1 and said pin. The distance value of the first timing signal S1 at said pin is for example given by a length of a diagonal of a bounding box, in particular in an AOCV bonding box, enclosing the first common point CP1 and said pin. The depth value and the distance value of the first timing signal S1 are independent of the second common point CP2, in particular of a second timing signal S2 initiated at the second common point CP2, and of any further common point of the design being not the first common point CP1.

Thus, the depth value of the first timing signal S1 is
equal to zero at the input pin of the first buffer element B1,
equal to one at the output pin of the first buffer element B1 and at the input pin of the second buffer element B2,
equal to two at the output pin of the second buffer element B2 and at the clock input pin C1 of the first register R1,
equal to three at the output pin Q1 of the first register R1 and at the input pin of the third buffer element B3,
equal to four at the output pin of the third buffer element B3 and at the first input pin A1 of the gate A, and
equal to five at the output pin QA of the gate A and at the data input pin D2 of the second register R2.

Further, the depth value of the first timing signal S1 is
equal to zero at the input pin of the fourth buffer element B4,
equal to one at the output pin of the fourth buffer element B4 and at the input pin of the fifth buffer element B5,
equal to two at the output pin of the fifth buffer element B5 and at the input pin of the sixth buffer element B6,
equal to three at the output pin of the sixth buffer element B6 and at the input pin of the seventh buffer element B7,
equal to four at the output pin of the seventh buffer element B7 and at the clock input pin C2 of the second register R2, and
equal to five at the output pin Q2 of the second register R2.

For alternative designs, the first timing path, in particular its cells and interconnects, may differ from the example of FIG. 2A. However, from what was explained above, the skilled reader will readily be able to compute the depth and/or distance value of the first timing path analogously. The same holds for the second timing path.

A second timing signal S2 may be initiated at the second common point CP2. The second timing signal S2 has a plurality of attributes varying along the second timing path including for example an arrival time and a slew. According to the improved concept, the plurality of attributes of the second timing signal S2 further comprises a depth value and a distance value. For any pin of the second timing path, the depth value of the second timing signal S2 at said pin corresponds to a number of logic stages between the second common point CP2 and said pin. The depth value and the distance value of the second timing signal S2 are independent of the first common point CP1, in particular of the first timing signal S1, and of any further common point of the design being not the second common point CP2.

Thus, the depth value of the second timing signal S2 is
equal to zero at the clock input pin C3 of the third register R3,
equal to one at the output pin Q3 of the third register R3 and at the second input pin A2 of the gate A,
equal to two at the output pin QA of the gate A and at the data input pin D4 of the fourth register R3.

Further, the depth value of the second timing signal S2 is
equal to zero at the input pin of the eighth buffer element B8,
equal to one at the output pin of the eighth buffer element B8 and at the input pin of the ninth buffer element B9, and
equal to two at the output pin of the ninth buffer element B9 and at the clock input pin C4 of the fourth register R4.

It is highlighted, that the first timing signal S1 and the second timing signal S2 are not merged at any point since they originate from different common points of the design. According to the improved concept, this holds irrespectively of the particular design. In particular for the example of FIG. 2A, the first timing signal S1 and the second timing signal S2 are not merged at the gate A, for example at the output pin QA of the gate A. Consequently, the depth value of the first timing signal S1 and of the second timing signal S2 at the output pin QA of the gate A are independent of each other. In particular, there is no merged signal being formed which has as a depth value a worst-case value of the first and the second timing signal S1, S2.

Figure 2B:
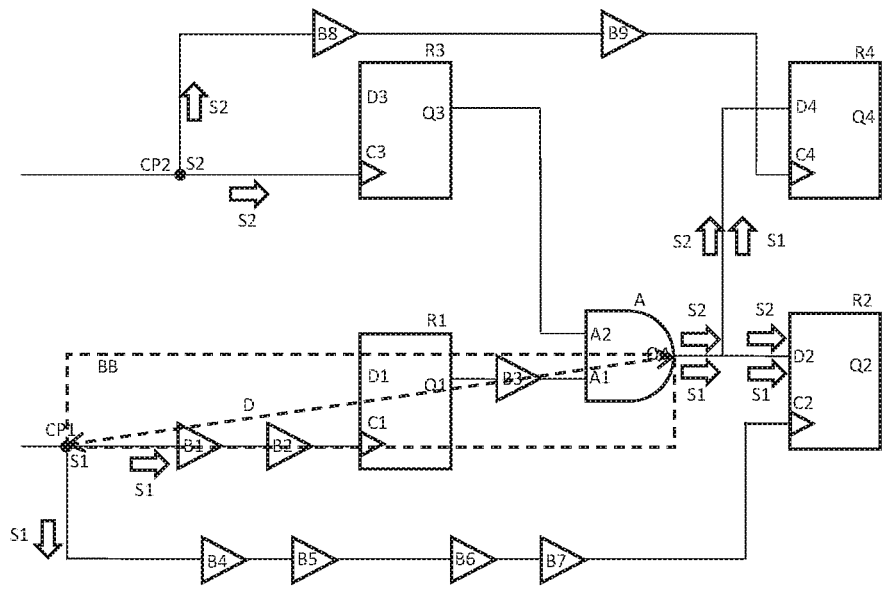

Analogously, the distance value of the first and the second timing signal S1, S2 may be computed for each pin of the first timing path and the second timing path, respectively. As an example, FIG. 2B shows a bounding box BB enclosing the first common point CP1 and the output pin QA of the gate A. The length of the diagonal D of the bounding box BB corresponds to the distance value of the first timing signal S1 at the output pin QA of the gate A. The distance value of the first and second timing signals S1, S2 may be calculated analogously.

Each pair of neighboring pins of the first timing path represents a timing arc of the first timing path. That is, for example the output pin of the first buffer element B1 and the input pin of the first buffer element B1 represent a timing arc of the first timing path. The same holds analogously for the second, third, fourth, fifth, sixth, seventh buffer elements B2, B3, B4, B5, B6, B7 and their respective input and output pins. Furthermore, the output pin Q1 and the clock input pin C1 of the first register represent a timing arc of the first timing path and the output pin QA and the first input pin A1 of the gate A represent a timing arc of the first timing path.

Analogously, each pair of neighboring pins of the second timing path represents a timing arc of the second timing path. For example the output pin QA and the second input pin A2 of the gate A represent a timing arc of the second timing path.

Based on the determined depth and distance values of the first timing signal S1, a total depth value and a total distance value, respectively, may be calculated for each timing arc of the first timing path. Based on the total depth and/or on the total distance value, a derating value for the delay of each of said timing arcs may be determined. The derating values for the timing arcs of the first timing path may for example be stored to a computer-readable memory. Then, a derated delay may be calculated for the first timing path based on the respective derating values according to GBA.

In further implementations of the method, for each timing arc of the first and/or of the second timing path a backward depth and analogously a backward distance may be calculated. For a timing arc of the first timing path, the backward depth may for example be given by a number of logic stages between an end point of the first timing path, for example the data input pin D2 of the second register R2, and a pin, for example an output pin, of said timing arc. The backward distance of said timing arc is for example given by a length of a diagonal of a backward bounding box enclosing the output pin of the timing arc and the respective end point, for example the data input pin D2 are in the clock input pin C2, respectively, of the second register R2.

Consequently, the backward depth is for example
equal to zero at the output pin QA of the gate A,
equal to one at the output pin of the third buffer element B3,
equal to two at the output pin Q1 of the first register R1,
equal to three at the output pin of the second buffer element B2, and equal to four at the output pin of the first buffer element B1.

Further, the backward depth is for example equal to zero at the output pin Q2 of the second register R2, equal to one at the output pin of the seventh buffer element B7, equal to two at the output pin of the sixth buffer element B6, equal to three at the output pin of the fifth buffer element B5, and equal to four at the output pin of the fourth buffer element B4.

For alternative designs, the first timing path, in particular its cells and interconnects, may differ from the example of FIG. 2A. However, from what was explained above, the skilled reader will readily be able to compute the respective backward depths and/or distances of the first timing path analogously. The same holds for the second timing path.

The total depth values may for example be calculated based on the determined depth value of the first timing signal S1 and the backward depths. For example, the total depth value may be calculated for each timing arc of the first timing path by summing up the depth value of the first timing signal S1 and the backward depth at the output pin of a respective timing arc.

In the example of FIG. 2A, for each timing arc comprised by the capture path of the first timing path, that is for example for the timing arcs corresponding to the respective input and output pins of the fourth, fifth, sixth and seventh buffer element B4, B5, B6, B7, and the second register R2, the total depth value is equal to five. Analogously, for each timing arc comprised by the launch path of the first timing path, that is for example for the timing arcs corresponding to the respective input and output pins of the first, second and third buffer element B1, B2, B3, the clock input pin C1 and the output pin Q1 of the first register R1 and the first input pin A1 and the output pin QA of the gate A, the total depth value is equal to five.

Analogously, the total distance value may be calculated for each of the timing arcs, for example of the first timing path. Then, as described above, the derated delay may be calculated for the first timing path based on the respective derating values according to GBA.

For example, when considering a timing constraint corresponding to a specified maximum delay of the first timing path, the derated delay is longer than a nominal delay of the first timing path. Due to the statistical nature of manufacturing variations, the larger the total depth values and the lower the total distance values of the timing arcs of the first timing path, the less is the derated delay in this case, that is the closer is the derated delay to the nominal delay. Inversely, when considering a timing constraint corresponding to a specified minimum delay of the first timing path, the derated delay is less than the nominal delay of the first timing path. Then, the larger the total depth values and the lower the total distance values of the timing arcs of the first timing path, the higher is the derated delay, meaning again the closer is the derated delay to the nominal delay.

Figure 2C:
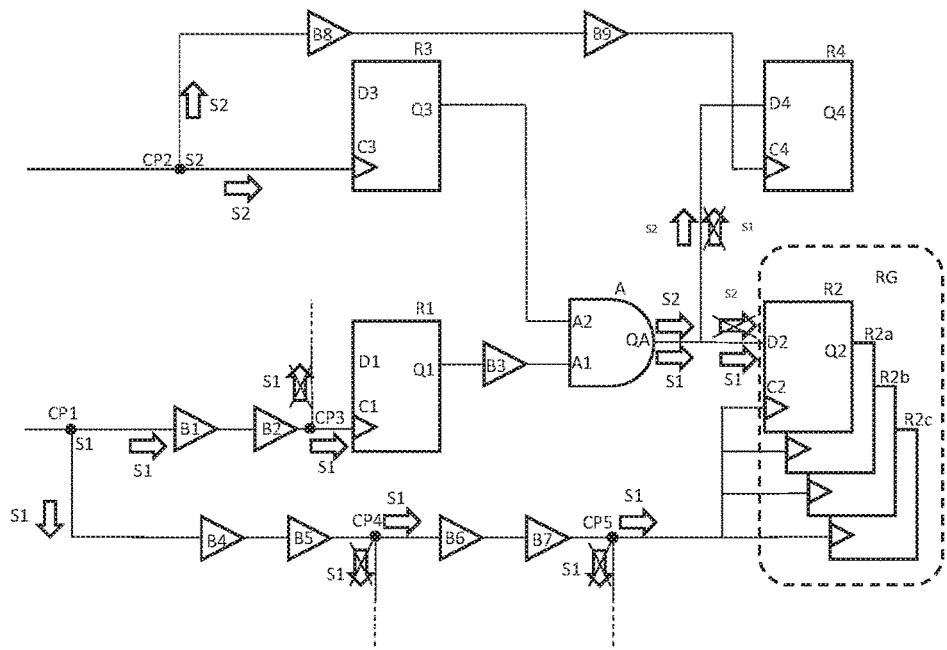
FIG. 2C shows a further exemplary part of an integrated circuit design and aspects of a further exemplary implementation of a method according to the improved concept.

FIG. 2C shows a further exemplary part of an integrated circuit design and aspects of a further exemplary implementation of a method according to the improved concept. The design shown in FIG. 2C is based on the design shown in FIGS. 2A and 2B.

The design further comprises three further registers R2a, R2b, R2c with a respective input clock pins connected to the output pin of the seventh buffer element B7. Accordingly, the further registers R2a, R2b, R2c act as respective capture devices of three further timing paths having the same capture path as the first timing path. The further registers R2a, R2b, R2c and the second register R2 form a group of capture devices RG. While the launch paths of the further timing paths may differ from the launch path of the first timing path, all of the first timing path and the further timing paths have the same common point, namely the first common point CP1. Correspondingly, according to the improved concept the first timing path and the further timing paths may be treated all at once by means of the first timing signal S1 as described with respect to FIGS. 2A and 2B. In this way, runtime and memory requirements of the GBA may be reduced.

Is highlighted, that the number of capture devices contained by the register group of capture devices RG not limited to four but can be significantly larger, depending on how many timing paths having the first common point CP1 as a common point exist in the design. Analogously, also a plurality of launch devices corresponding to the first common point CP1 may be grouped and treated all at once by means of the first timing signal S1 as described with respect to FIGS. 2A and 2B.

In addition, a third common point CP3 of a third timing path is shown between the input clock pin C1 of the first register and the output pin of the second buffer element B2. A fourth common point CP4 of a fourth timing path is shown between the input pin of the sixth buffer element B6 and the output pin of the fifth buffer element B5. A fifth common point CP5 of a fifth timing path is shown between the input clock pins of the registers R2, R2a, R2b, R2c and the output pin of the seventh buffer element B7.

However, since the first timing signal S1, in particular the attributes of the first timing signal S1, in particular the depth and the distance value of the first timing signal S1, does not depend on any of the third, fourth and fifth common point CP3, CP4, CP5, the depth and distance values calculated as described with respect to FIG. 2A remain unchanged also for the design shown in FIG. 2C. In particular, the depth value of the first timing signal S1 is not reset at the third, the fourth or the fifth common point CP3, CP4, CP5.

Furthermore, it is shown in FIG. 2C that the first timing signal S1 is prevented from propagating to directions that are not relevant for the first common point CP1, that is to directions that do not lead from the first common point CP1 to one of the second register of the group of capture devices RG. This signal pruning of the first timing signal S1 is indicated by crossed arrows representing the first timing signal S1 next to the third, the fourth and the fifth common point CP3, CP4, CP5 and next to the connection between the output pin QA of the gate A and the data input pin D4 of the fourth register R4. Analogously, the signal pruning of the second timing signal S2 is indicated by a crossed arrow representing the second timing signal S2 next to the connection between the output pin QA of the gate A and the data input pin D2 of the second register R2. By means of the signal pruning, runtime and memory requirements of the GBA may be significantly reduced. The signal pruning may for example be implemented by depositing respective markers at the respective pins of the first timing path.

The exemplary implementations of the methods according to the improved concept described with respect to FIGS. 2A to 2C may be readily adapted by the skilled person to perform GBA of an IC also for alternative designs. The concepts described herein are then used analogously.

Figure 3:
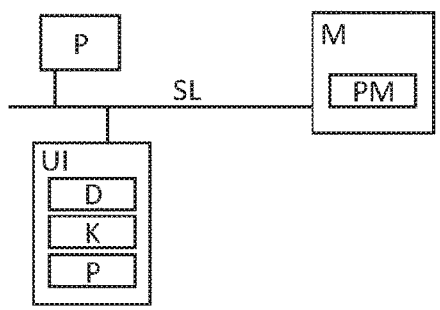
FIG. 3 shows schematically an exemplary implementation of a computer system according to the improved concept.

FIG. 3 shows an exemplary implementation of a computer system according to the improved concept. The computer system comprises at least one processor P connected to one or more signal lines SL. The signal lines SL may for example constitute a communication bus. The computer system also comprises a user interface UI connected to the one or more signal lines SL, the user interface UI comprising for example a display D, a keyboard K and/or a pointer device P such as a mouse.

The computer system also comprises a computer-readable memory M connected to the one or more signal lines. The memory M may for example comprise a computer program module PM. The computer program module PM contains for example instructions for GBA of an IC according to the improved concept. In particular, the processor P is configured to execute the computer program module PM and when the computer program module PM is being executed by the processor P, the instructions cause the processor P to execute a process comprising steps, in particular all steps, of a method for performing GBA of an IC according to the improved concept described herein.

By means of a method, a computer program product and/or a computer system according to the improved concept, the amount of pessimism in GBA, in particular the amount of pessimism introduced by AOCV analysis in GBA, may be reduced. At the same time, resource requirements of the GBA may be controlled. This, in turn, may reduce over-design and thus extra power requirements, allow to increase the operating frequency and thus to improve performance, and to speed-up timing sign-off and hence reduce development time.

Applying an AOCV derating adjustment to the delay of a timing arc generally may require a conservative estimate for overall path depth and distance, measured from the respective common point of the considered timing path to the end point (usually a register data input pin) of the considered timing path.

As described above, for example with respect to FIGS. 2A to 2C, the first timing signal S1 being specifically associated to the first common point CP1 provides a "forward" depth and distance metrics given by the depth and distance values of the first timing signal. Metrics for the remainder of the path, namely the backward depth and backward distance, may be computed separately. Importantly, the backward depth and distance are not prone to common point pessimism i). Combining the depth and distance values of the first timing signal S1 with the backward depth and distance thus fully addresses the source of common point pessimism i).

Furthermore, over the course of propagation, timing signals that correspond to different common points, for example the first and the second timing signal S1, S2 corresponding to the first and the second common point CP1, CP2, respectively, CPs not merged, reducing the pessimism further by alleviating the merging pessimism ii).

We claim:

1. A method performed by an electronic design automation (EDA) tool set operating in a computing system, the method for performing graph based static timing analysis of an integrated circuit, the method comprising:
   receiving, by the EDA tool set, a design of the integrated circuit, the design having a set of timing paths;
   identifying, by the EDA tool set, a subset of the set of timing paths, wherein each timing path of the subset of the set of timing paths has a launch path, a capture path and a common point of the launch path and the capture path, and wherein the common point is identical for all timing paths of the subset of timing paths;
   initiating, by the EDA tool set, a timing signal at the common point, the timing signal propagating along a plurality of timing arcs of the subset of timing paths, wherein the timing signal has a plurality of attributes varying with the propagation of the timing signal along the plurality of timing arcs, wherein the plurality of attributes includes one or more of a depth value or a distance value, and wherein propagating the timing signal comprises pruning at least one timing signal initiated at the common point and associated with a particular timing path by preventing the propagation of the timing signal along the particular timing path;
   determining, by the EDA tool set, an advanced on-chip variation (AOCV) metric associated with the timing signal for propagating along a timing arc from the plurality of timing arcs, the AOCV metric representing one or more of a depth value of the timing signal at a pin of the timing arc or a distance value of the timing signal at the pin of the timing arc;
   determining, by the EDA tool set, a derating factor associated with the timing signal for a delay of propagating along the timing arc, the derating factor depending on the AOCV metric;
   generating, by the EDA tool set, a timing report based on the derating factor;
   transmitting, by the EDA tool set, the generated timing report for presentation via the EDA tool set;
   applying, by the EDA tool set, responsive to sending the generated timing report for presentation, modifications to the design of the integrated circuit; and
   transmitting, by the EDA tool set, the modified design of the integrated circuit to a storage device to retrieve for manufacture of a circuit based on the design.

2. The method of claim 1, wherein the depth value of the timing signal at said pin of said at least one timing arc is given by a number of cells of the design lying between the common point and said pin of said at least one timing arc.

3. The method of claim 1, wherein the distance value of the timing signal at said pin of said at least one timing arc is given by a distance between the common point and said pin of said at least one timing arc.

4. The method of claim 1, wherein the design comprises a first group of registers and a second group of registers, wherein each register of the first group is involved in one of the subset of timing paths as a launch device, and wherein each register of the second group is involved in one of the subset of timing paths as a capture device.

5. The method of claim 1, further comprising calculating at least one delay value of the subset of timing paths depending on a derated delay of said at least one timing arc, wherein the derated delay of said at least one timing arc depends on a nominal delay of said at least one timing arc and on the determined derating factor and the timing report is generated based on the calculated delay.

6. The method of claim 1, wherein the depth value and the distance value of the timing signal depend on the common point of the subset of timing paths and do not depend on a further common point of a further timing path of the design, the further timing path being not comprised by the subset of timing paths.

7. The method of claim 1, wherein the determining of the derating factor comprises determining a backward depth of said at least one timing arc and summing up the depth value of the timing signal at said pin of said at least one timing arc and the backward depth.

8. The method of claim 7, wherein the backward depth of said at least one timing arc is given by a number of cells of the design lying between an end point of the subset of timing paths and said pin of said at least one timing arc.

9. The method of claim 1, wherein the determining of the derating factor comprises determining a backward distance of said at least one timing arc and summing up the distance value of the timing signal at said pin of said at least one timing arc and the backward distance.

10. The method of claim 9, wherein the backward distance of said at least one timing arc is given by a distance between an end point of the subset of timing paths and said pin of said at least one timing arc.

11. The method of claim 1, wherein the design comprises a further timing path, the further timing path being not comprised by the subset of timing paths, wherein the further timing path includes said at least one timing arc; and wherein the timing signal initiated at the common point of the subset of timing paths is not merged with a further timing signal initiated at the further common point.

12. The method of claim 1, wherein the subset of timing paths comprises at least one branching pin with at least one external path segment connected to the branching pin, wherein the external path segment is not comprised by the subset of timing paths, and wherein the method further comprises associating a marker to the branching pin, the marker indicating that said external path segment is not comprised by the subset of timing paths.

13. The method of claim 12, further comprising preventing the timing signal from propagating along said external path segment based on the marker.

14. The method of claim 1, wherein the method is performed by a circuit design tool or by an electronic design automation, EDA, tool.

15. The method of claim 1, further comprising:
grouping a plurality of registers having a common timing path into a register unit to reduce the number of signal representation in a graph based analysis of the circuit design of the integrated circuit.

16. A non-transitory computer-readable storage medium storing instructions of an electronic design automation (EDA) tool set operating in a computing system, the stored instructions which when executed by a computer processor, cause the computer processor to perform steps comprising:
receiving, by the EDA tool set, a design of the integrated circuit, the design having a set of timing paths;
identifying, by the EDA tool set, a subset of the set of timing paths, wherein each timing path of the subset of the set of timing paths has a launch path, a capture path and a common point of the launch path and the capture path, and wherein the common point is identical for all timing paths of the subset of timing paths;
initiating, by the EDA tool set, a timing signal at the common point, the timing signal propagating along a plurality of timing arcs of the subset of timing paths, wherein the timing signal has a plurality of attributes varying with the propagation of the timing signal along the plurality of timing arcs, and wherein the plurality of attributes includes one or more of a depth value or a distance value, and wherein propagating the timing signal comprises pruning at least one timing signal initiated at the common point and associated with a particular timing path by preventing the propagation of the timing signal along the particular timing path;
determining, by the EDA tool set, an advanced on-chip variation (AOCV) metric associated with the timing signal for propagating along a timing arc from the plurality of timing arcs, the AOCV metric representing one or more of a depth value of the timing signal at a pin of the timing arc or a distance value of the timing signal at the pin of the timing arc;
determining, by the EDA tool set, a derating factor associated with the timing signal for a delay of propagating along the timing arc, the derating factor depending on the AOCV metric;
generating, by the EDA tool set, a timing report based on the derating factor;
transmitting, by the EDA tool set, the generated timing report for presentation via the EDA tool set;
applying, by the EDA tool set, responsive to sending the generated timing report for presentation, modifications to the design of the integrated circuit; and
transmitting, by the EDA tool set, the modified design of the integrated circuit to a storage device to retrieve for manufacture of a circuit based on the design.

17. The non-transitory computer-readable storage medium of claim 16, wherein the depth value of the timing signal at said pin of said at least one timing arc is given by a number of cells of the design lying between the common point and said pin of said at least one timing arc.

18. The non-transitory computer-readable storage medium of claim 16, wherein the distance value of the timing signal at said pin of said at least one timing arc is given by a distance between the common point and said pin of said at least one timing arc.

19. A computer system comprising
a computer processor; and
a non-transitory computer-readable storage medium storing instructions, the stored instructions of an electronic design automation (EDA) tool set operating in a computing system which when executed by the computer processor, cause the computer processor to perform steps comprising:
receiving, by the EDA tool set, a design of the integrated circuit, the design having a set of timing paths;
identifying, by the EDA tool set, a subset of the set of timing paths, wherein each timing path of the subset of the set of timing paths has a launch path, a capture path and a common point of the launch path and the capture path, and wherein the common point is identical for all timing paths of the subset of timing paths;
initiating, by the EDA tool set, a timing signal at the common point, the timing signal propagating along a plurality of timing arcs of the subset of timing paths, wherein the timing signal has a plurality of attributes varying with the propagation of the timing signal along the plurality of timing arcs, and wherein the plurality of attributes includes one or more of a depth value or a distance value, and wherein propagating the timing signal comprises pruning at least one timing signal initiated at the common point and associated with a particular timing path by preventing the propagation of the timing signal along the particular timing path;
determining, by the EDA tool set, an advanced on-chip variation (AOCV) metric associated with the timing signal for propagating along a timing arc from the plurality of timing arcs, the AOCV metric representing one or more of a depth value of the timing signal at a pin of the timing arc or a distance value of the timing signal at the pin of the timing arc;
determining, by the EDA tool set, a derating factor associated with the timing signal for a delay of propagating along the timing arc, the derating factor depending on the AOCV metric;
generating, by the EDA tool set, a timing report based on the derating factor;
transmitting, by the EDA tool set, the generated timing report for presentation via the EDA tool set;

applying, by the EDA tool set, responsive to sending the generated timing report for presentation, modifications to the design of the integrated circuit; and transmitting, by the EDA tool set, the modified design of the integrated circuit to a storage device to retrieve for manufacture of a circuit based on the design.

20. The computer system of claim 19, wherein the depth value of the timing signal at said pin of said at least one timing arc is given by a number of cells of the design lying between the common point and said pin of said at least one timing arc.

21. The computer system of claim 19, wherein the distance value of the timing signal at said pin of said at least one timing arc is given by a distance between the common point and said pin of said at least one timing arc.

* * * * *